US006271662B1

(12) United States Patent
Schroeder

(10) Patent No.: US 6,271,662 B1
(45) Date of Patent: Aug. 7, 2001

(54) METHOD OF MATCHING SENSORS TO CRANKSHAFTS AND CAMSHAFTS

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/265,637

(22) Filed: Mar. 10, 1999

(51) Int. Cl.$^7$ ........................................................ G01B 7/14
(52) U.S. Cl. ................ 324/207.21; 324/207.25; 11/207.12; 338/32 R
(58) Field of Search .................. 324/207.2, 207.12, 324/207.22, 207.25, 207.21, 202, 235, 225; 338/32 R, 32 H; 219/121.68

(56) References Cited

U.S. PATENT DOCUMENTS

| | | | |
|---|---|---|---|
| 4,835,467 | 5/1989 | Gokhale | 324/166 |
| 4,926,122 | 5/1990 | Schroeder et al. | 324/207.13 |
| 4,939,456 | 7/1990 | Morelli et al. | 324/207.21 |
| 5,570,016 * | 10/1996 | Schroeder et al. | 324/207.25 |
| 5,714,883 | 2/1998 | Schroeder et al. | 324/207.22 |
| 5,731,702 * | 3/1998 | Schroeder et al. | 324/207.21 |
| 5,754,042 | 5/1998 | Schroeder et al. | 324/207.25 |
| 5,814,985 * | 9/1998 | Oudet | 324/207.2 |
| 5,916,459 * | 6/1999 | Schroeder et al. | 219/121.66 |

\* cited by examiner

*Primary Examiner*—Christine Oda
*Assistant Examiner*—Subhash A Zaveri
(74) *Attorney, Agent, or Firm*—Margaret A. Dobrowitsky

(57) ABSTRACT

A method for adjusting a sensor so that its output signal will indicate a tooth edge location coinciding with the nominal center line of the sensor, or coinciding with any other specified point on the face of the sensor. The proposed method applies to all types of sensors (magnetic and otherwise) which rely on the comparison between input and reference signals to generate a binary output signal. As a part of the manufacturing process, each sensor is oriented and located with respect to a stationary segment of a target wheel identical to that which will be subsequently used in operation. It is preferred for the segment to include a portion of a tooth, a portion of a slot, and one tooth edge specified as either falling or rising. The tooth edge is precisely aligned with the centerline of the sensor at a desired offset angle with respect to the actual tooth edge measured from the center of the target wheel. Now the reference level is adjusted until the output signal switches state. For example, in a paired MR sensor wired in parallel with first and second resistors, one of the resistors is laser trimmed until the output signal switches state. Similarly, instead of the reference signal, the DC offset of the input signal can be adjusted to achieve the same goal.

13 Claims, 3 Drawing Sheets

METHOD OF MATCHING SENSORS TO CRANKSHAFTS AND CAMSHAFTS

TECHNICAL FIELD

The present invention relates to a method for sensing precise angular position of a rotating object and more particularly to a method for sensing crankshaft or camshaft rotational position wherein a sensor, preferably but not exclusively a dual element magnetoresistive (MR) sensor, is matched to a predetermined location of a target wheel mounted on the crankshaft or camshaft as part of the manufacturing process of the sensor.

BACKGROUND OF THE INVENTION

It is well known in the art that the resistance modulation of magnetoresistors can be employed in position and speed sensors with respect to moving magnetic materials or objects (see for example U.S. Pat. Nos. 4,835,467, 4,926,122, and 4,939,456). In such applications, the magnetoresistor (MR) is biased with a magnetic field and electrically excited, typically, with a constant current source or a constant voltage source. A magnetic (i.e., ferromagnetic) object rotating relative and in close proximity to the MR, such as a toothed wheel, produces a varying magnetic flux density through the MR, which, in turn, varies the resistance of the MR. The MR will have a higher magnetic flux density and a higher resistance when a tooth of the rotating target wheel is adjacent to the MR than when a slot of the rotating target wheel is adjacent to the MR. The use of a constant current excitation source provides an output voltage from the MR that varies as the resistance of the MR varies.

Increasingly more sophisticated spark timing and emission controls introduced the need for crankshaft sensors capable of providing precise position information during cranking. Various combinations of magnetoresistors and single and dual track toothed or slotted wheels (also known as encoder wheels and target wheels) have been used to obtain this information (see for example U.S. Pat. Nos. 5,570,016, 5,714,883, 5,731,702, and 5,754,042).

An example of a known sensor used with a target wheel is depicted at FIGS. 1A and 1B. The sensor 10 consists of a first magnetoresistor MR1, a second magnetoresistor MR2, a biasing magnet 16, a first resistor R1, a second resistor R2, and terminals 22, 24, 26, and 28. The positive terminal 30 of voltage source +V is applied to terminal 22 and the negative terminal 32, considered to be at ground, is applied to terminal 28. As a result, a voltage $V_{MR}$ appears at terminal 24 which is produced by the voltage divider circuit of MR1 and MR2, and a voltage $V_{REF}$ appears at terminal 26 which is produced by the voltage divider circuit of R1 and R2. $V_{MR}$ is input to the non-inverting terminal of a comparator (with hysteresis) 34 and $V_{REF}$ is input to the inverting terminal of the comparator, wherein the comparator is supplied with power through voltage source +V which is applied to terminal 36 and ground applied to terminal 38.

As shown at FIG. 1B, the sensor 10' may optionally include the comparator 34, whereupon the only outputs therefrom are terminal 30 for the voltage source +V, terminal 40 for $V_{OUT}$ and terminal 32 for ground.

According to the prior art, the following method is used to match MR1 with MR2. During the manufacturing process of the sensor 10, R1 and R2 do not have the same value to ensure that $V_{OUT}$ 40 of comparator 34 is at a high voltage level (or, if desired, a low voltage level). $V_{REF}$ is gradually changed by trimming of R1 or R2 until $V_{OUT}$ switches voltage levels. For example, trimming is performed by a laser beam 42 of a laser 44, wherein a portion of the cross-section 46, 46' of the selected resistor is ablated to thereby change its resistance.

Instead of the reference signal being adjusted, the DC offset of the input signal ($V_{MR}$) can be adjusted to achieve the same goal. FIG. 1A depicts a sensor 10 having an optional known DC offset 52 therefor incorporated therein, wherein the active path of the two alternative paths shown by dashed lines in FIG. 1A depends on whether the DC offset is present. FIG. 1C depicts an example of a DC offset 52 in the form of a variable resistance R3, as for example a rheostat (potentiometer) or a resistor selector box having a plurality of selectable resistors. Alternatively, the DC offset can be effected by individually adjustable current sources.

According to this method of the prior art, the reference signal or the DC offset is adjusted to match the MRs in free space. Now, the sensor 10 undergoes final packaging. Thus, this manufacturing process eliminates MR and bias magnet mismatch.

However, accurate engine crank position information is needed for ignition timing and state and federally mandated misfire detection. The crank position information is encoded on a rotating target wheel in the form of teeth and slots. The edges of the teeth define predetermined crank positions. The sensor is required to detect these edges accurately and repeatably over a range of air gaps and temperatures. Preferably, the output signal of the sensor should indicate a tooth edge passing through the nominal centerline of the sensor, although, a small fixed offset is acceptable. Usually, the specified accuracy is plus or minus 0.5 degrees with respect to the actual edge, which provides a one degree tolerance band. Quite frequently, however, fundamentally good sensors with even tighter tolerance bands must be rejected because they do not fall into the plus or minus 0.5 degree range, e.g. a sensor having a tolerance band from 0.25 degrees to 0.75 degrees.

Accordingly, what is needed in the art is a method to adjust a sensor so that its output signal will indicate a tooth edge location coinciding with the nominal center line of the sensor, or coinciding with any other specified point on the face of the sensor.

SUMMARY OF THE INVENTION

The present invention is a method for adjusting a sensor so that its output signal will indicate a tooth edge location coinciding with the nominal center line of the sensor, or coinciding with any other specified point on the face of the sensor. The proposed method applies to all types of sensors (magnetic and otherwise) which rely on the comparison between input and reference signals to generate a binary output signal.

As a part of the manufacturing process, each sensor is oriented and located relative to a stationary segment of a target wheel identical to that which will be subsequently used in operation with the sensor, wherein the location provides a nominal air gap with respect to the segment. In the preferred form of the present method, this segment must consist of at least a portion of a tooth, a portion of a slot, and one tooth edge specified as either falling or rising. The tooth edge is precisely aligned with the centerline of the sensor at a desired offset angle with respect to the actual tooth edge measured from the center of the target wheel. Now the reference level is adjusted until the output signal switches state.

For example, in a paired MR sensor first voltage divider wired in parallel with a second voltage divider composed of first and second resistors, one of the resistors is trimmed, wherein a portion of the cross-section is laser ablated to thereby change its resistance, until the output signal switches state, as indicated on an indicator. Instead of the reference signal, the DC offset of the input signal can be adjusted to achieve the same goal. Depending on the design of the sensor and a variety of other factors, this match adjustment can take place either prior to or after the sensor assembly process, but most preferably after the sensor assembly process so that stacking of all tolerances is present when the match adjustment occurs.

There are three interesting cases of match adjusting involving the trimming methodology, wherein the thermal coefficient of resistance is the same for each of R1 and R2.

In case 1, switching occurs on a rising tooth edge (from low to high output). If this is the only mode, then initially R2>R1 sufficiently to have a low output within all tolerances of the operative setup. Trimming is then performed such as by laser ablation of R1 to increase its resistance until $V_{OUT}$ switches from low to high.

In case 2, switching occurs on a falling tooth edge (from high to low output). If this is the only mode, then initially R1>R2 sufficiently to have a high output within all tolerances of the operative setup. Trimming is then performed such as by laser ablation of R2 to increase its resistance until $V_{OUT}$ switches from high to low.

In case 3, the value of R1 is approximately the same as the value of R2 initially, as for example after one of the resistors has been trimmed to establish a desired output (ie., if trimming for switching from low to high, and the initial state is already high, then R2 is trimmed to make $V_{OUT}$ go low; this is now the initial state). Now R1 is trimmed until $V_{OUT}$ switches from low to high. Due to hysteresis built into the comparator circuit, the two switching points are not occurring at the same R1/R2 ratio.

Cases 1 and 2 require trimming of only one of the resistors, but the amount of trim can be relatively large depending on stack-up of all tolerances in the sensor and its fixture. Generally, case 3 involves less trimming than cases 1 and 2.

With regard to matching adjustment involving the DC offset in the form of a variable resistance, the initial state of $V_{OUT}$ must be high, ie., $V_{MR} > V_{REF}$. The variable resistance is adjusted until $V'_{MR}$ has a lower value than $V_{REF}$. At this point $V_{OUT}$ will switch from high to low. This will work for a falling tooth edge. For a rising tooth edge, the initial state of $V_{OUT}$ must be low, ie., $V'_{MR} < V_{REF}$. It is assumed that the variable resistance has sufficient range such that the variable resistance is adjusted in the opposite direction so that $V_{OUT}$ will switch from low to high.

Accordingly, it is an object of the present invention to provide a method for adjusting a sensor so that its output signal will indicate a tooth edge location coinciding with the nominal center line of the sensor, or coinciding with any other specified point on the face of the sensor.

It is an additional object of the present invention to provide a method for adjusting a sensor so that its output signal will indicate a tooth edge location coinciding with the nominal center line of the sensor, or coinciding with any other specified point on the face of the sensor utilizing a single track target wheel.

It is still another object of the present invention to provide a method for adjusting a sensor so that its output signal will indicate a tooth edge location coinciding with the nominal center line of the sensor, or coinciding with any other specified point on the face of the sensor utilizing a dual track target wheel.

These, and additional objects, advantages, features, and benefits of the present invention will become apparent from the following specification.

DESCRIPTION OF THE PREFERRED EMBODIMENT

Figure 1A:
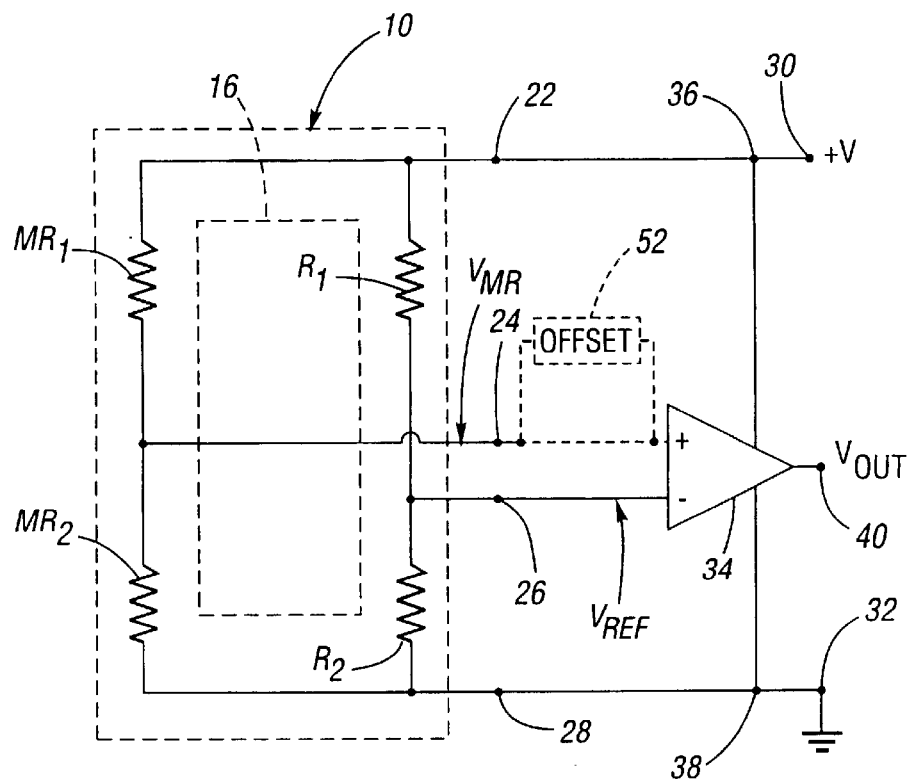
FIG. 1A depicts an example of a prior art sensor using a pair of MRs and electrical circuit associated therewith, including an optional DC offset adjustment shown in phantom.
Figure 1B:
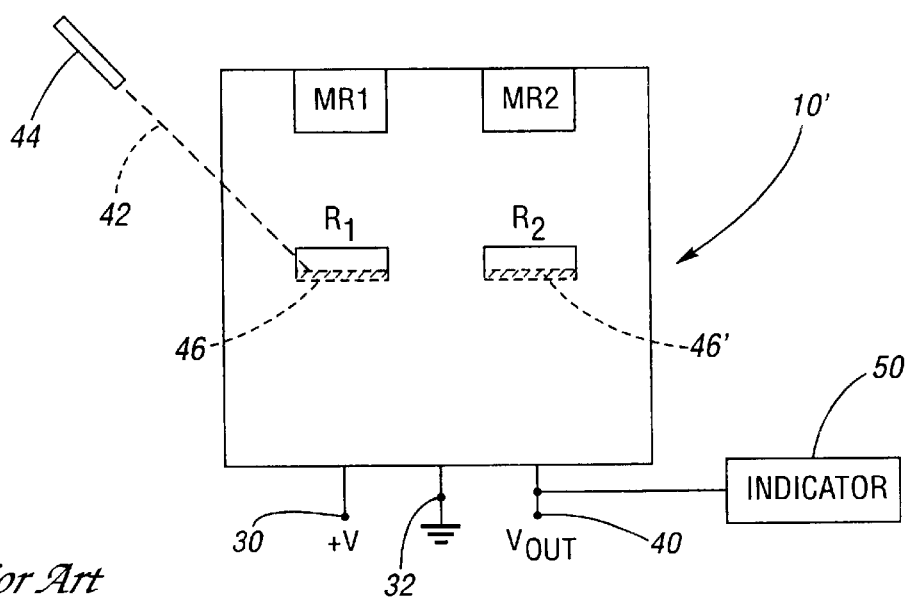
FIG. 1B depicts an example of a prior art sensor packaged to include a comparator for providing a binary output signal therefrom, shown being laser trimmed in free space according to the method of the prior art.
Figure 2:
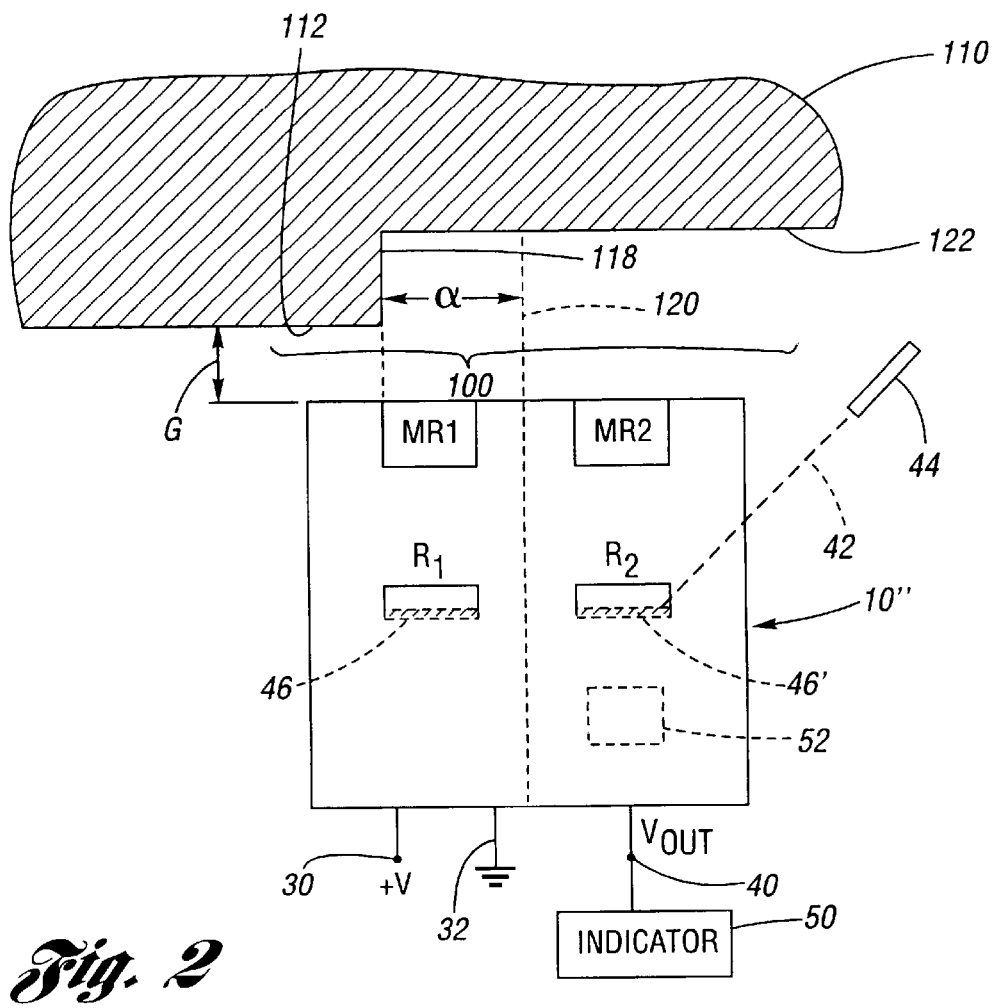
FIG. 2 depicts an example of the preferred method according to the present invention, wherein the sensor being laser trimmed while spaced from an operatively paired target wheel at a predetermined air gap.

Referring now to FIG. 2 an example of the preferred method according to the present invention will be elaborated. In this regard, for purposes of example, a sensor 10" similar to sensor 10' shown at FIG. 1B is utilized, having internal electrical components arranged as shown at FIG. 1A, it being however understood that the method is applicable to other types of sensors.

During the manufacturing process of the dual MR sensor 10", the sensor is aligned with a selected segment of a stationary single track target wheel 110 comprised of a plurality of teeth 112 and slots 122 which provide a pattern or respectively high and low permeability. The placement of the sensor 10" is such that it is distanced from a tooth by a nominal air gap G and at a desired offset angle α as measured from the center of the target wheel with respect to a tooth edge 118 and the center line 120 between MR1 and MR2, and otherwise at exactly the same position the sensor will be at relative to the target wheel in actual operation, as for example the same transverse position of the sensor with respect to the target wheel, as well as at the same orientation of the sensor relative to the target wheel, as for example the same tilt.

After the alignment described above has been achieved, one or the other of resistors R1 and R2 is now laser trimmed, wherein a laser beam 42 of a laser 44 ablates a portion 46, 46' of the cross-section of one of the resistors R1, R2, until $V_{OUT}$ switches voltage levels, as indicated by an indicator 50. Subsequently, sensor 10" undergoes whatever final packaging yet remains.

Figure 1C:
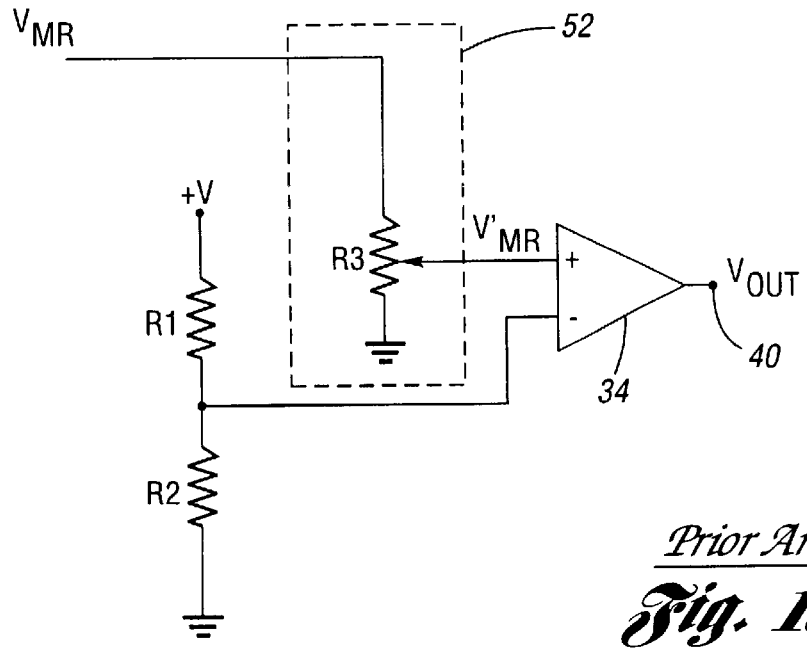
FIG. 1C depicts an example of a prior art adjustable DC offset incorporated in a circuit for a sensor, which is adjustable according to the method of the prior art.

Instead of the reference signal being adjusted, the DC offset of the input signal ($V_{MR}$) can be adjusted to achieve the same goal. As that indicated at FIG. 1, the sensor 10" now has an optional known DC offset adjustment component 52 incorporated therein (shown in phantom). In this method of the present invention, with the sensor 10" located adjacent the segment 100 as shown at FIG. 2, the DC offset is adjusted until $V_{OUT}$ switches voltage levels, as indicated by an indicator 50. Subsequently, sensor 10" undergoes whatever final packaging yet remains.

Thus, this manufacturing process eliminates MR and bias magnet mismatch in conjunction with the particular magnetic effects of the selected segment of the target wheel 110, thereby creating a dual MR matched sensor compensated for the particular magnetic effects of the segment 100 so as to switch output voltage levels precisely upon encountering the segment, in this case passage of a tooth edge 118 of the target wheel. In this regard, note is taken as to the direction of rotation of the target wheel 110, that is, whether the tooth edge 118 is rising or falling with respect to the sensor 10".

Figure 3A:
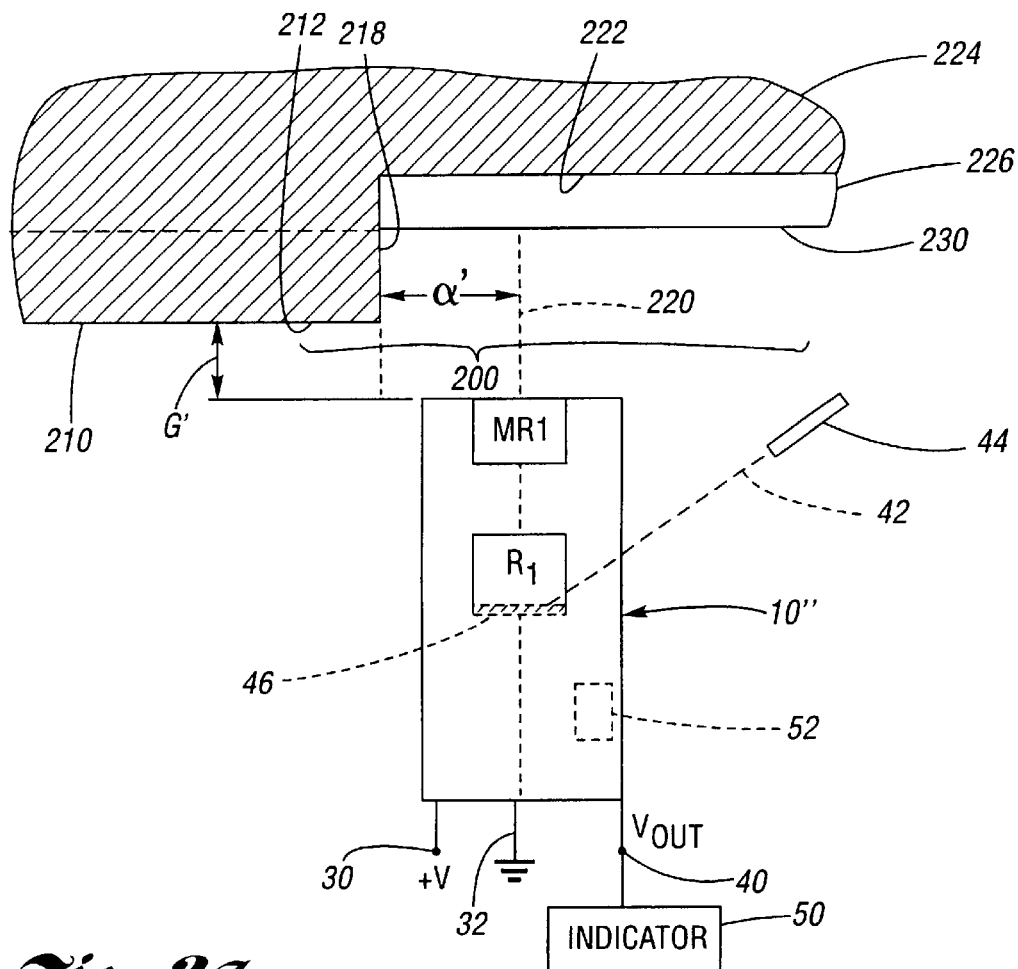
FIGS. 3A and 3B show an alternative method according to the present invention.

FIG. 3A shows an alternative method according to the present invention using the exemplary sensor 10" of FIG. 2, wherein a dual track target wheel 210 is used which is composed of a data track 224 and a reference track 226. The data track 224 is comprised of a plurality of teeth 212 and slots 222 thereby providing a pattern of high and low magnetic permeability, whereas the reference track 226 is characterized by a surface 230 having invariant magnetic permeability at all angles of rotation (i.e. the reference track has a constant radius).

Figure 3B:
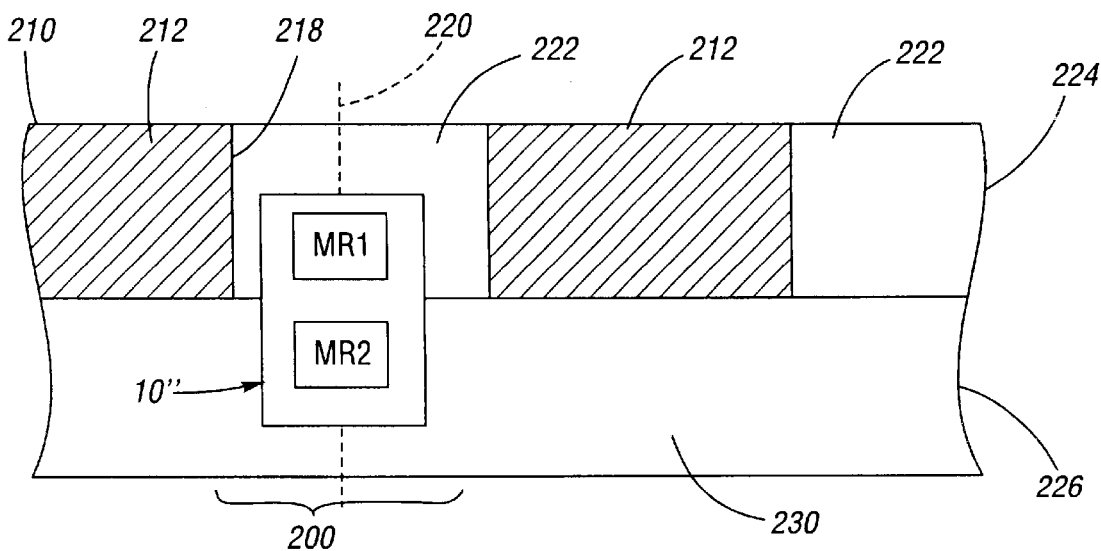

As shown in FIG. 3A, the distance from the center of the target wheel 210 to the slots 222 of the data track 224 is less than the distance from the center of the target wheel to the surface 230 of the reference track 226, whereas the distance from the center of the target wheel 210 to the teeth 212 of the data track is greater than the distance from the center of the target wheel to the surface of the reference track. The sensor 10" is positioned as shown in FIGS. 3A and 3B such that MR1 is adjacent the data track 224 and MR2 is adjacent the reference track 226 at segment 200 of the target wheel 220.

During the manufacturing process of the dual MR sensor 10", it is placed a distance from a tooth 212 by a nominal air gap G', at a desired offset angle α' as measured from the center of the target wheel with respect to a tooth edge 218 and the center line 220 of MR1 and MR2 at the segment 200, and otherwise at exactly the same position the sensor will be at relative to the target wheel in actual operation, as for example the same straddling position of the sensor with respect to the two tracks (FIG. 3B), as well as at the same orientation of the sensor relative to the target wheel, as for example tilt.

After the alignment described above has been achieved, R1 or R2 is now laser trimmed (see cross-section portion 46 of resistor R1 in FIG. 3A) in the manner previously described using a laser beam 42 and laser 44, until $V_{OUT}$ of FIG. 3A switches voltage levels as indicated by an indicator 50. Subsequently, sensor 10" undergoes final packaging.

Instead of the reference signal being adjusted, the DC offset of the input signal ($V_{MR}$) can be adjusted to achieve the same goal. As that indicated at FIG. 1, the sensor 10" now has an optional known DC offset adjustment component 52 incorporated therein (shown in phantom). In this method of the present invention, with the sensor 10" located adjacent the segment 200 as shown at FIGS. 3A and 3B, the DC offset is adjusted until $V_{OUT}$ switches voltage levels, as indicated by an indicator 50. Subsequently, sensor 10" undergoes whatever final packaging yet remains.

Thus, this manufacturing process eliminates MR and bias magnet mismatch in conjunction with the effects of the presence of a dual track ferromagnetic target wheel 210 thereby creating a dual MR matched sensor compensated for the effects of a selected segment of a ferromagnetic target wheel having a data track 224 of alternating high and low magnetic permeability and a reference track 226 of invariant magnetic permeability capable of switching voltage levels precisely upon encountering the passage of a tooth edge 218 of the data track at the segment. In this regard, note is taken as to the direction of rotation of the target wheel 220, that is, whether the tooth edge 218 is rising or falling with respect to the sensor 10".

It is to be understood that while magnetoresistors (MRs) were exemplified in the foregoing detailed description, other analogous sensing elements, such as for example Hall elements, are similarly represented, the class of such electronic components being inclusively referred to as magnetically sensitive devices.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method for matching a sensor with respect to a predetermined location of a target wheel comprising the steps of:

providing a sensor that produces an input signal and a reference signal, wherein the input signal is responsive to predetermined variations of an adjacent rotating article;

providing the target wheel having a predetermined pattern of variations to which the input signal is responsive, wherein the target wheel is identical to a predetermined target wheel that the sensor will be operatively paired with subsequently;

placing the sensor facing a preselected segment of the target wheel at a predetermined distance from, and at a predetermined orientation with respect to, a selected surface the target wheel;

connecting the sensor to an electrical circuit wherein a binary output signal is provided responsive to comparison between the input and reference signals, and wherein a first output signal of the binary output signal is produced; and adjusting one of the input and reference signals with laser trimming a selected resistor so as to cause the binary output signal to switch to a second output signal.

2. The method of claim 1, wherein said step of adjusting comprises adjusting a DC offset of the input signal.

3. The method of claim 1, wherein in said second step of providing a target wheel, said pattern of variations comprises a plurality of teeth and slots; and wherein said step of placing comprises: placing the sensor facing the predetermined segment at a predetermined orientation, wherein the segment includes at least a portion of a slot, at least a portion of a tooth located at a predetermined offset angle with respect to the sensor, wherein the tooth edge is specified as either rising or falling; and spacing the sensor from the tooth a distance equal to a predetermined air gap when the sensor is operatively paired with the predetermined target wheel.

4. The method of claim 3, wherein said step of adjusting comprises adjusting a DC offset of the input signal.

5. The method of claim 3, wherein said second step of providing provides a two track target wheel comprising a first track and a second track, wherein said pattern of variations comprises a plurality of teeth and slots on said first track.

6. The method of claim 5, wherein said step of adjusting comprises adjusting a DC offset of the input signal.

7. A method for matching a sensor with respect to a predetermined location of a target wheel comprising the steps of:

providing a sensor having a pair of first electrical components and a pair of second electrical components, wherein the first pair of electrical components produce an input signal responsive to predetermined variations of an adjacent rotating article, and wherein the second pair of electrical components provides a reference signal;

providing a target wheel having a predetermined pattern of variations to which said pair of electrical components is responsive, wherein the target wheel is identical to a predetermined target wheel the sensor will be operatively paired with subsequently;

placing the sensor facing a preselected segment of the target wheel at a predetermined distance from, and at a predetermined orientation with respect to, a selected surface the target wheel;

connecting the sensor to an electrical circuit wherein a binary output signal is provided responsive to comparison between the input and reference signals, and wherein a first output signal of the binary output signal is produced; and trimming a selected electrical component of the second pair of electrical components so as to cause the binary output signal to switch to a second output signal.

8. The method of claim 7, wherein in said second step of providing a target wheel, said pattern of variations comprises a plurality of teeth and slots; and wherein said step of placing comprises: placing the sensor facing the predetermined segment at a predetermined orientation, wherein the segment includes at least a portion of a slot, at least a portion of a tooth located at a predetermined offset angle with respect to the sensor, wherein the tooth edge is specified as either rising or falling; and spacing the sensor from the tooth a distance equal to a predetermined air gap when the sensor is operatively paired with the predetermined target wheel.

9. The method of claim 8, wherein said step of trimming comprises laser ablating a selected portion of the selected electrical component of the second pair of electrical components.

10. The method of claim 8, wherein said second step of providing provides a two track target wheel comprising a first track and a second track, wherein said pattern is provided by a plurality of teeth and slots on said first track.

11. A method for matching a sensor with respect to a predetermined location of a target wheel comprising the steps of:

providing a sensor comprising a first voltage divider composed of first and second magnetically sensitive devices, and a second voltage divider composed of first and second resistors wired in parallel with the first voltage divider, wherein the first and second magnetically sensitive devices produce an input signal responsive to predetermined variations of an adjacent rotating article, and wherein the first and second resistors provide a reference signal;

providing a target wheel having a predetermined pattern of variations to which the first and second magnetically sensitive devices are responsive, wherein the target wheel is identical to a predetermined target wheel the sensor will be operatively paired with subsequently;

placing the sensor facing a preselected segment of the target wheel at a predetermined distance from, and at a predetermined orientation with respect to, a selected surface the target wheel;

connecting the sensor to an electrical circuit wherein a binary output signal is provided responsive to comparison between the input and reference signals, and wherein a first output signal of the binary output signal is produced; and laser trimming a selected one of said first and second resistors to thereby cause the binary output signal to switch to a second output signal.

12. The method of claim 10, wherein in said second step of providing a target wheel, said pattern of variations comprises a plurality of teeth and slots; and wherein said step of placing comprises: placing the sensor facing the predetermined segment at a predetermined orientation, wherein the segment includes at least a portion of a slot, at least a portion of a tooth located at a predetermined offset angle with respect to the sensor, wherein the tooth edge is specified as either rising or falling; and spacing the sensor from the tooth a distance equal to a predetermined air gap when the sensor is operatively paired with the predetermined target wheel.

13. The method of claim 11, wherein said second step of providing provides a two track target wheel comprising a first track and a second track, wherein said pattern of variations is provided by a plurality of teeth and slots on said first track.

* * * * *